United States Patent
Yeakley et al.

(10) Patent No.: US 8,059,358 B2
(45) Date of Patent: Nov. 15, 2011

(54) METHOD OF RETAINING A TRANSDUCER ON A BASE

(75) Inventors: Darryl W. Yeakley, Erie, CO (US); Frank A. Goodknight, Niwot, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/106,229

(22) Filed: May 12, 2011

(65) Prior Publication Data

US 2011/0211278 A1    Sep. 1, 2011

Related U.S. Application Data

(62) Division of application No. 11/733,812, filed on Apr. 11, 2007, now Pat. No. 7,965,472.

(51) Int. Cl.
*G11B 21/08*    (2006.01)
*G11B 5/55*    (2006.01)

(52) U.S. Cl. ........................................ 360/75; 360/261.1

(58) Field of Classification Search .................... 360/75, 360/241–241.3, 251.1–251.5, 261.1–261.3, 360/266.2–267.8, 291–291.3
See application file for complete search history.

(56) References Cited

U.S. PATENT DOCUMENTS

| | | | |
|---|---|---|---|
| 4,415,821 A | 11/1983 | Wedman et al. |
| 4,864,170 A | 9/1989 | Eguchi |
| 5,267,229 A | 11/1993 | Ikegame |
| 5,793,574 A | 8/1998 | Cranson et al. |
| 5,818,668 A | 10/1998 | Gonzales |
| 5,949,619 A | 9/1999 | Eckberg et al. |
| 5,986,372 A | 11/1999 | Joffe |
| 6,065,741 A | 5/2000 | Davis et al. |
| 6,437,946 B2 | 8/2002 | Todd |
| 6,594,118 B1 | 7/2003 | Nayak et al. |
| 6,985,430 B1 | 1/2006 | Villiard et al. |

FOREIGN PATENT DOCUMENTS

JP    01010470 A    1/1989

*Primary Examiner* — Craig A. Renner
(74) *Attorney, Agent, or Firm* — Brooks Kushman P.C.

(57) ABSTRACT

A method of retaining a transducer for a digital storage apparatus that reads and writes data to a tape as the tape is moved in a tape drive path across the transducer. According to the method a head assembly is attached to the base to be movable relative to the base in a linear path that is perpendicular to the tape drive path. Movement of the head assembly is guided on a track that is partially defined by the head and partially defined by the base. At least two balls are disposed in the track between the base and the head assembly. A magnetic coupling retains the balls within the track. A linear motor operatively engages the head assembly to move the head assembly to follow the tape.

5 Claims, 6 Drawing Sheets

METHOD OF RETAINING A TRANSDUCER ON A BASE

CROSS-REFERENCE TO RELATED APPLICATIONS

This application is a division of U.S. application Ser. No. 11/733,812 filed Apr. 11, 2007, now U.S. Patent No. 7,965,472 issued Jun. 21, 2011, the disclosure of which is incorporated in its entirety by reference *herein*.

BACKGROUND

Linear guides for transducers are used in media drives to align a transducer with respect to a media track or tracks. Examples of transducer positioning devices are disclosed in U.S. Pat. Nos. 6,437,946 and 6,985,430.

Linear guides for transducers are generally preloaded to remove play and minimize undesirable head movements. The most common method of preloading is to use springs that bias the linear guides. Spring preloading mechanisms may be a source of reliability and performance issues. Reliability and performance problems may arise due to component fatigue, component wear, and unpredictable frictional forces that may occur at preload component interfaces. Such reliability and performance problems may contribute to poor actuator performance and reduced linear guide and head actuator product life.

Linear guide spring preload mechanisms are small parts of considerable complexity. The cost of assembling such small, complex parts increases the cost of assembling the linear guides and head actuator assemblies.

The present invention is directed to overcoming the above problems as summarized below.

SUMMARY

According to one aspect of the present invention, a method is provided for retaining a movable head of a transducer on a base of the transducer. The transducer may include a linear motor that operatively engages the head. The movable head and the base define a track between the head and the base. At least two balls are disposed in the track between the base and the head. The method comprises providing a magnetic field within a track that retains the balls in the track and retains the head on the base. Movement of the tape is tracked in a direction perpendicular to the direction of travel of the tape. A representative signal is provided to a controller that is representative of the movement of the tape in the perpendicular direction. The head is driven by the linear motor in a linear direction in response to a signal from the controller that is based upon the representative signal.

According to other aspects of the method of the invention, the tape may have at least one servo track wherein the step of tracking the movement of the tape further comprises determining the location of the servo tracks. The method further comprises providing a permanent magnet on either or both of the base or the head that provides a magnetic field within the track.

According to another aspect of the present invention, a transducer is disclosed for a digital storage apparatus that reads and writes data to a tape as the tape is moved in a tape drive path across the transducer. The tape has at least one servo track that is read by the storage apparatus. A controller provides a control signal that is indicative of the position of the tape. The transducer comprises a base and a head assembly that is attached to the base and movable relative to the base in a linear path. The linear path is perpendicular to the tape drive path. A guide assembly guides the movement of the head assembly. The guide assembly has a track that is partially defined by the head and partially defined by the base. The guide assembly includes at least two balls that are disposed in the track between the base and the head assembly. A magnetic coupling retains the balls within the track. A linear motor operatively engages the head assembly to move the head assembly in response to the control signal to follow the tape.

According to other aspects of the invention, the magnetic coupling includes at least one magnet disposed adjacent to the track that has a magnetic flux field that retains the balls between the head assembly and the base. The magnetic flux also retains the head assembly in position relative to the base. Movement of the head assembly is guided on the linear path as the head assembly rolls on the balls.

In one embodiment, the magnet may be attached to the head assembly (or movable member). Alternatively, the magnets could be placed on the stationary member or magnets could be provided on both the stationary and movable members. A wear plate may be disposed on the head assembly between the magnet and the balls. The wear plate disposed on the head assembly may be referred to as a head wear plate, and a base wear plate may be provided on the face of the base.

According to another aspect of the present invention, a linear guide is provided that comprises a stationary member defining a first portion of a track and a movable member defining a second portion of the track. At least two balls are disposed between the first and second portions of the track. A magnet is located proximate the first and second portions of the track that creates a flux field that retains the first and second portions of the track in engagement with the balls. The magnet also holds the first and second tracks in a parallel relationship with the movement of the movable member being limited to movement in a single linear direction.

According to other aspects of the invention as they relate to the linear guide, at least one magnet may be disposed on the movable member. Alternatively, the magnets could be placed on the stationary member or magnets could be provided on both the stationary and movable members. The stationary member may be a tower on a base of a read/write transducer with the movable member being a head assembly of the read/write transducer. The head of the read/write transducer may be secured to the frame of the read/write transducer to move in a single linear direction. The head of the read/write transducer may be operatively connected to a linear motor that moves the head of the read/write transducer relative to the base of the read/write transducer. In a further aspect of the invention, the linear motor may be assembled to the base of the read/write transducer.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
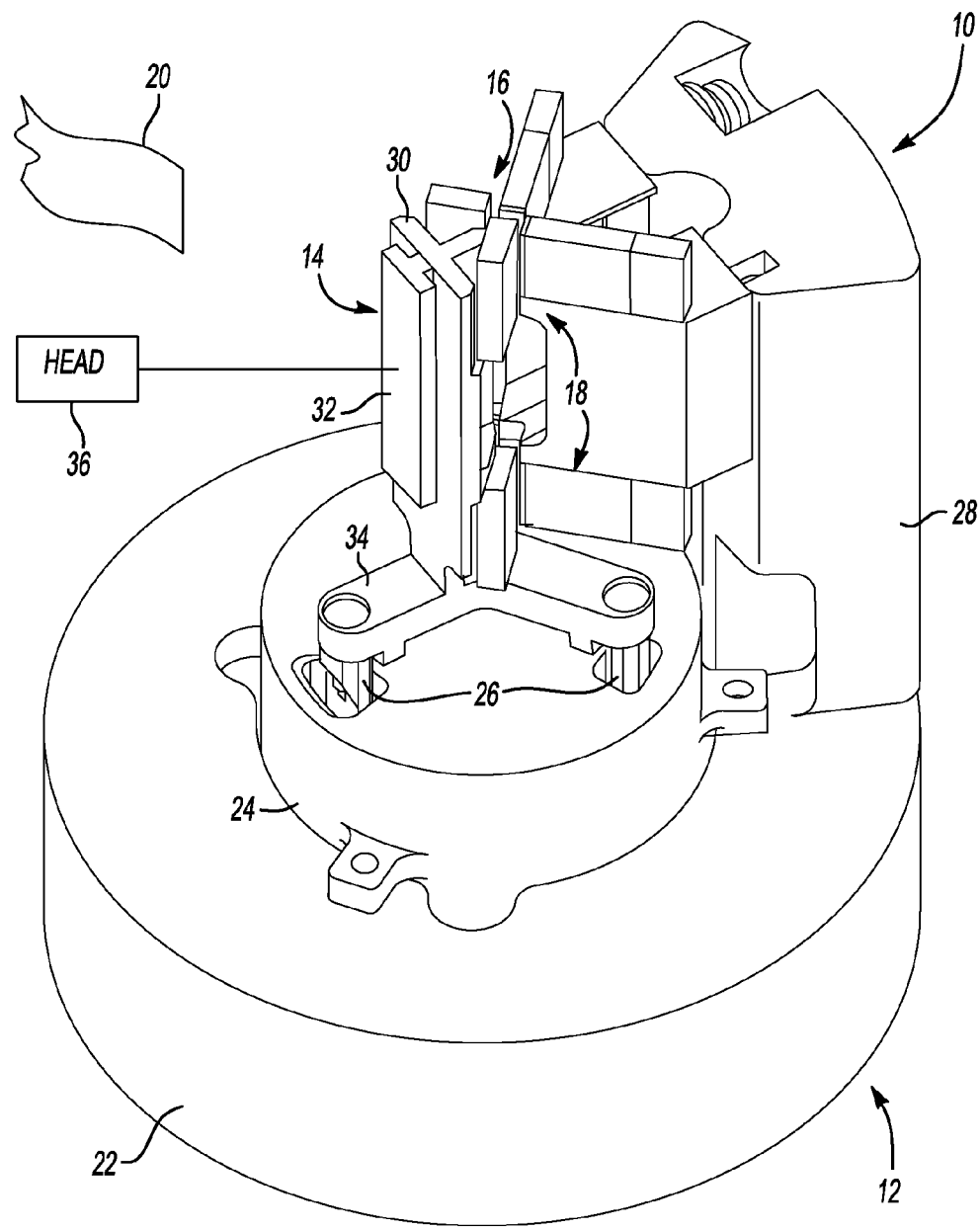
FIG. 1 is an outer perspective view of a head actuator.

Referring to FIG. 1, a transducer head positioning apparatus 10 is illustrated. The transducer head positioning apparatus 10 includes a base assembly 12 and a head assembly 14. The head assembly 14 is supported in part by a linear motion track 16 that is defined by both the base assembly 12 and the head assembly 14. A magnetic coupling system is generally represented by reference numeral 18 that functions in conjunction with the linear motion track 16 to guide the movement of the head assembly 14 relative to the base assembly 12. The head assembly 14 is used to read and write data to a data storage tape 20 in the illustrated embodiment. However, it should be understood that the invention is not limited to tape storage applications and could be adapted, for example, to disk storage applications.

The base assembly 12 includes a base 22 and a linear motor 24. The linear motor 24 has a plurality of legs 26 that operatively engage the head assembly 14 to move the head assembly 14 in a linear direction reciprocally relative to the base 22. The base assembly 12 also includes a tower 28 that extends from the base 22.

The head assembly 14 includes a frame 30 that defines a head support 32. The frame 30 also includes a tripod support 34 that is connected to the three legs 26 of the linear motor 24. A head 36 is attached to the head support 32. The head 36 is a read/write head which may also be referred to as a transducer head that is used to read and write data to a data storage tape or other data storage medium.

Figure 2:
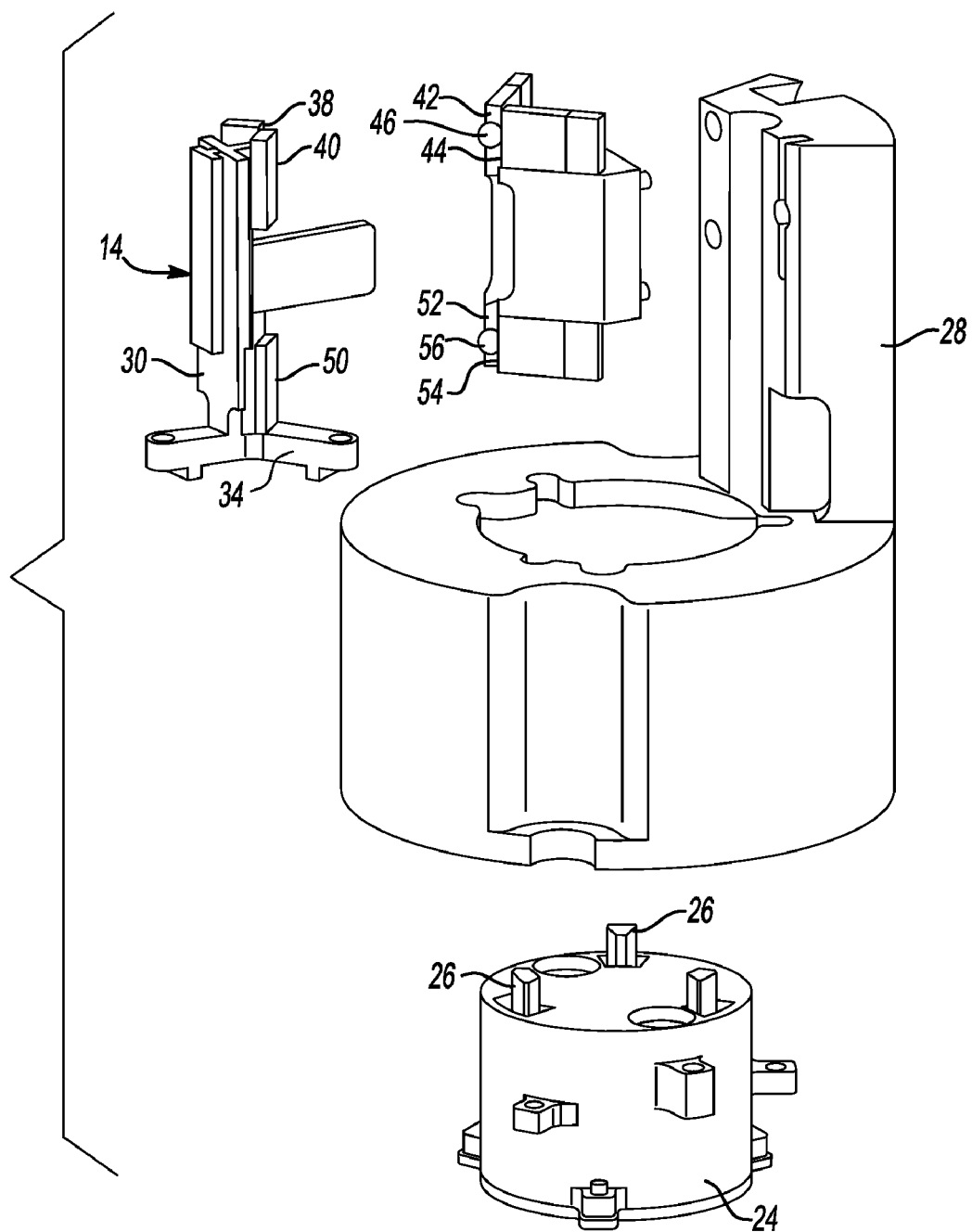
FIG. 2 is a front exploded perspective view of the head actuator.
Figure 3:
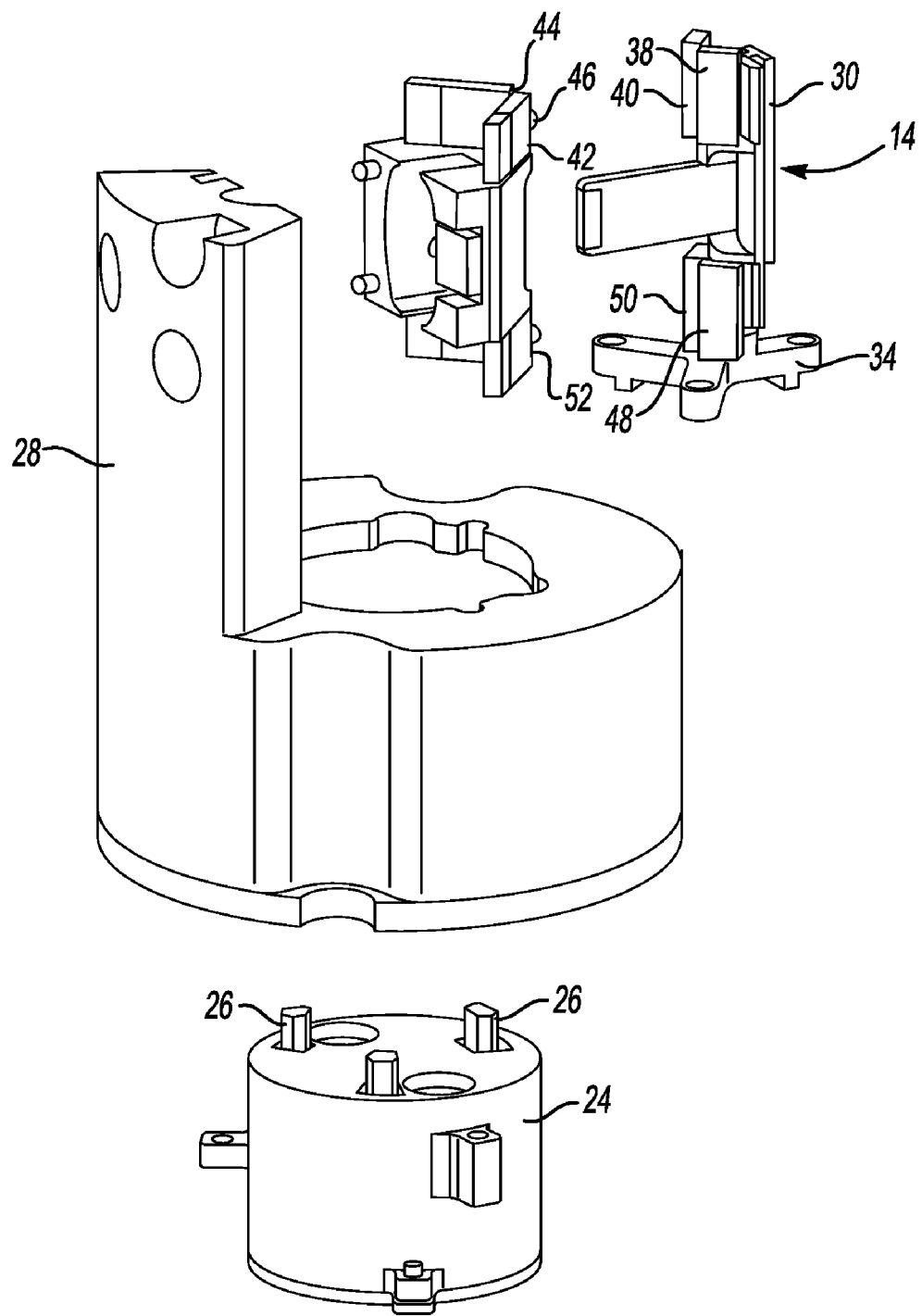
FIG. 3 is a rear exploded perspective view of the head actuator.

Referring to FIGS. 2 and 3, the transducer head positioning apparatus 10 is shown in oppositely oriented exploded perspective views. The linear motion track generally referred to in FIG. 1 by reference numeral 16 is separated into its component parts wherein a first upper movable track 38 and a second upper movable track 40 are provided on the head assembly 14. A first upper stationary track 42 and a second upper stationary track 44 are shown in a facing relationship relative to the first and second upper movable tracks 38 and 40. An upper ball 46 is restrained between the movable tracks 38, 40 and the stationary tracks 42, 44.

First and second lower movable tracks 48, 50 are provided on the frame 30 of the head assembly 14 at locations below the upper movable tracks 38, 40, as viewed in FIG. 2. First and second lower stationary tracks 52, 54 are provided below the first and second upper stationary tracks 42, 44, as illustrated in FIGS. 2 and 3. A lower ball 56 is confined within the movable tracks 48, 50 and the stationary tracks 52, 54.

The track 16 guides movement of the frame 30 in conjunction with the tower 28. The frame 30 is moved by the linear motor 24 that has legs 26 that engage the tripod support 34 of the frame 30. The linear motor 24 drives the legs 26 in a linear direction reciprocally in response to control signals received from a controller (not shown).

Figure 4:
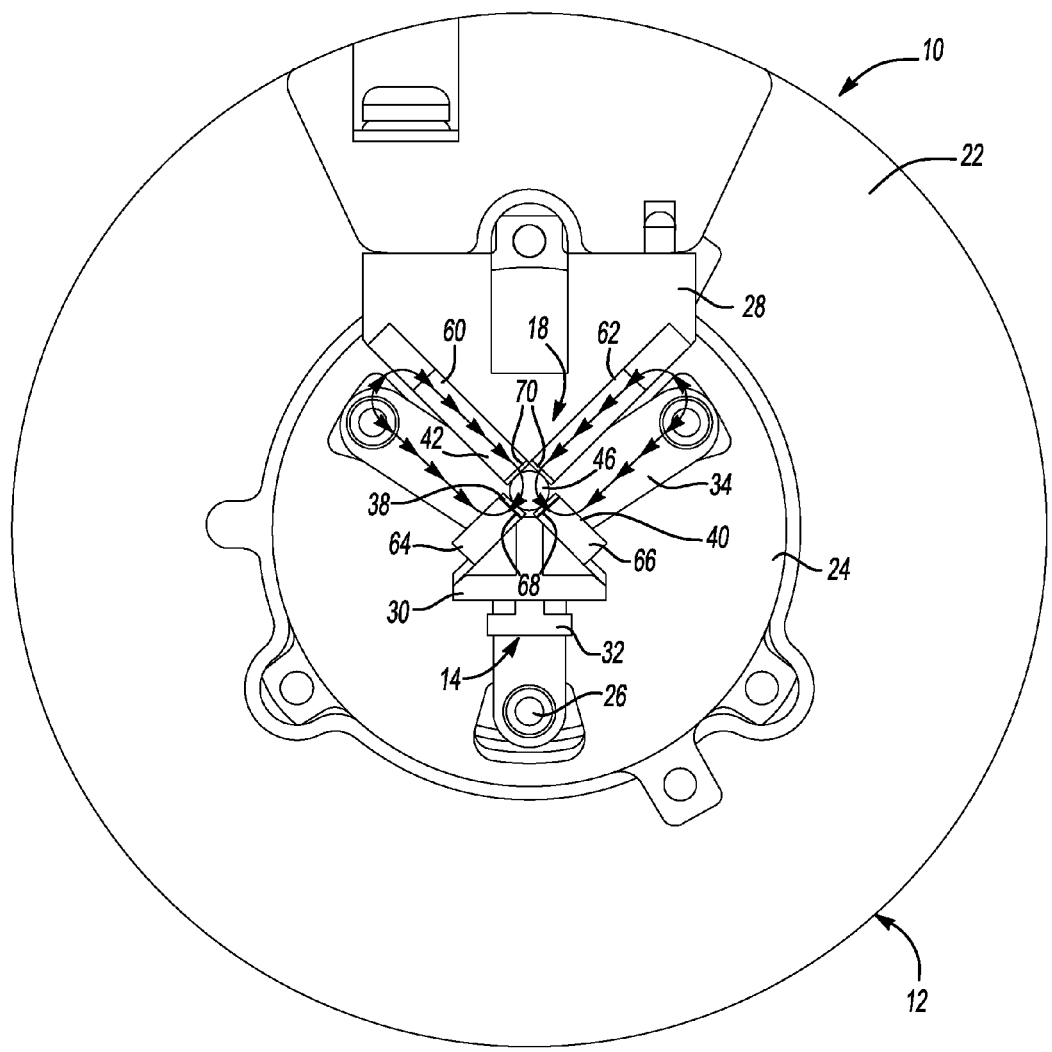
FIG. 4 is a top plan view of the head actuator.

The magnetic coupling system 18 is described by reference to FIG. 4. The transducer head positioning apparatus 10 includes the base assembly 12. The magnetic coupling system 18 retains the frame 30 of the head assembly 14. In the embodiment shown in FIG. 4, the magnetic coupling system 18 includes a first magnet 60 and a second magnet 62 that cooperate with the first magnetically attracted member 64 and the second magnetically attracted member 66 to support the frame 30 on the upper ball 46. A lower portion of the linear motion track 16 is not visible in FIG. 3, but is aligned with the upper portion of the linear motion track 16. The oval line with arrowheads illustrates generally the magnetic flux path of the magnetic coupling system 18. The magnetic flux path holds the ball 46 and magnetically attracted members 64, 66 to the magnets 60, 62. The frame 30 is generally free to move along the linear motion track 16 with upper ball 46 and lower ball 56 providing a rolling support for the frame 30 of the head assembly 14.

The legs 26 of the linear motor 24 engage the tripod support 34 of the head assembly 14 to reciprocally drive the head assembly 14 to track movement of the data storage tape perpendicular to the direction of movement of the data storage tape. Base wear plates 70 and head wear plates 68 are shown on the first and second magnets 60, 62 and on the first and second magnetically attracted members 64, 66, respectively. The wear plates 68, 70 are made of hardened steel or ceramic and reduce wear occurring as a result of the movement of the head assembly 14 as it rolls on the balls 46, 56.

Figure 5:
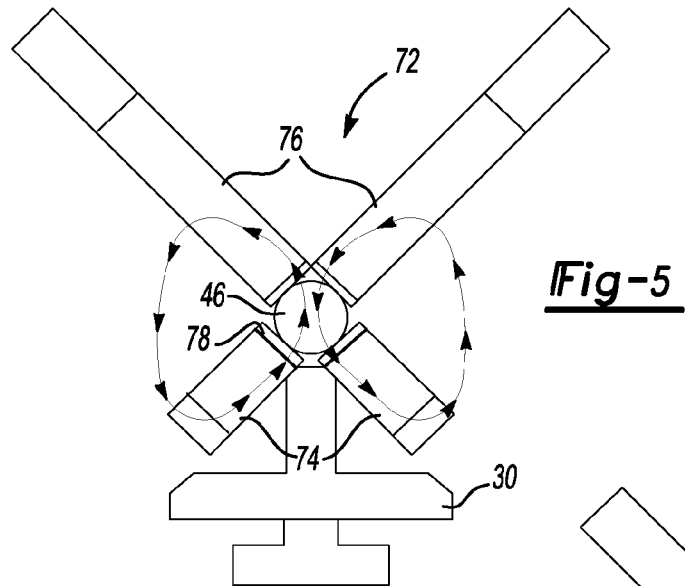
FIG. 5 is a diagrammatic top plan view of an alternative embodiment of a head actuator.

Referring to FIG. 5, a dual magnet track embodiment 72 is shown. The dual magnet track embodiment 72 includes head assembly magnets 74 and base magnets 76 that are arranged to provide a flux path that retains the ball 46 within the linear motion track 16. Ball 46 shown in FIG. 4 is the upper ball, while the lower ball 56 is maintained generally in alignment with the upper ball 46 in a similar arrangement. Wear plates 78 are provided to provide a wear resistant surface upon which the ball 46 may roll when the head assembly 14 is moved relative to the base assembly 12.

Figure 6:
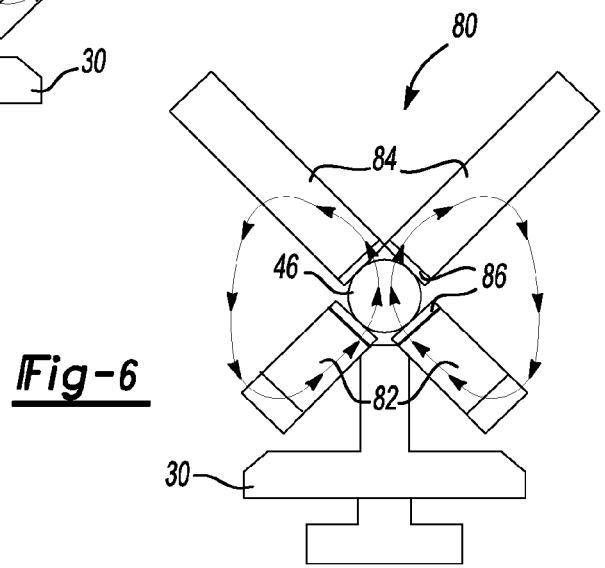
FIG. 6 is a diagrammatic top plan view of another alternative embodiment of a head actuator.

Referring to FIG. 6, a further embodiment of the present invention referred to as the head assembly magnet embodiment 80 is shown to include a pair of head magnets 82 that are assembled to the frame 30. Magnetically attracted members 84 are provided on the base assembly 12. The magnetically attracted members 84 may be steel or other ferrous material. Wear plates 86 may be provided in conjunction with or in addition to the magnetically attracted members 84 and the head magnets 82 to provide a wear surface over which the ball 46 may roll. A lower track may be provided that rolls on a ball 56 in like manner.

Figure 7:
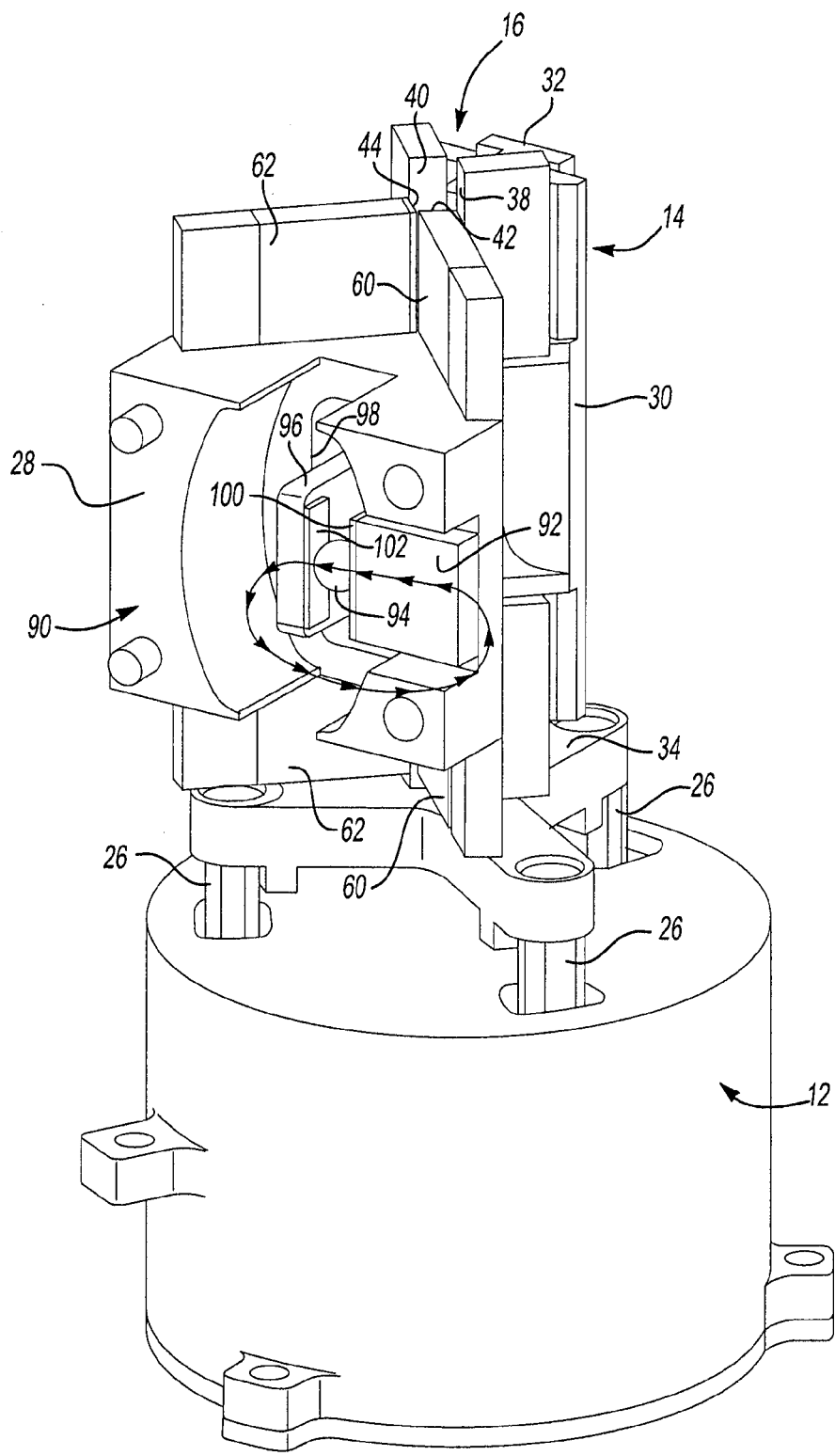
FIG. 7 is a side perspective view of an anti-rotation guide portion of the head actuator.

Referring to FIG. 7, an anti-rotation guide system 90 is shown in conjunction with the base assembly 12 and head assembly 14 that define the linear motion track 16 as previously described. The anti-rotation guide system 90 may be used in conjunction with the linear motion track 16 having a magnetic coupling system 18, as previously described with reference to FIGS. 1-5. The anti-rotation guide system 90 includes a magnet 92 and a ball 94 that cooperate with an anti-rotation flange 96 of the frame 30. The anti-rotation flange 96 extends through a slot 98 formed in the tower 28 of the base assembly 12. The oval line with arrowheads that passes through the magnet 92, ball 94 and anti-rotation flange 96 is provided to indicate the flux path of the anti-rotation guide system 90. The magnet 92 exerts a biasing force through the magnetic flux field that biases the anti-rotation flange 96 into engagement with the ball 94. A wear plate 100 may be provided on the magnet 92. Another wear plate 102 may be provided on the anti-rotation flange 96. The wear plate may be made of ferrous or ceramic material and may form part of the magnetic coupling system that couples the anti-rotation flange 96 to the magnet 92. The anti-rotation flange 96 may be moved when the linear motor moves the legs 26 to move the head assembly 14 as it tracks the data storage tape. When the frame 30 of the head assembly 14 moves up and down, as shown in FIG. 6, the anti-rotation flange 96 rolls the ball 94 between the wear plate 100 on the magnet 92 and wear plate 102 on the flange 96.

Figure 8:
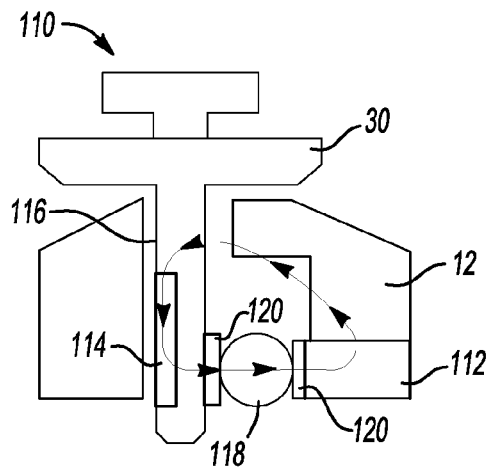
FIG. 8 is a diagrammatic top plan view of an alternative embodiment of an anti-rotation guide portion of a head actuator.

Referring to FIG. 8, a dual magnet anti-rotation system 110 is shown to include a magnet 112 that is attached to the base assembly 12 and a magnet 114 that is attached to the frame 30. A magnetic flux path is illustrated by the elliptical line with arrowheads that extends from the magnet 112 to the magnet 114 and through the ball 118. The magnets 112, 114 retain the ball 118 between the anti-rotation flange 116 and the base 12. Wear plates 120, as previously described, are provided for engagement with the ball 118 to reduce wear on the component parts of the dual magnet anti-rotation system 110 when the frame 30 rolls on the ball 118 relative to the base assembly 12. Wear plates 120 may also be included in the flux path if made of ferrous material.

Figure 9:
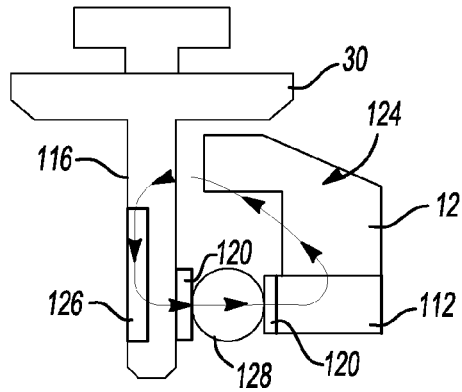
FIG. 9 is a diagrammatic top plan view of an alternative embodiment of an anti-rotation guide portion of a head actuator.

Referring to FIG. 9, a magnet anti-rotation system 124 is shown to include a magnet 126 that is attached to the frame 30 of the head assembly 14. A magnetic flux path is illustrated by the elliptical line with arrowheads that extend from the magnet 126 through the wear plates 120 and through the ball 128. The wear plate 120 on the base 12, if made of a ferrous material, may function as the magnetically attracted portion of the base 12. The magnet 126 retains the ball 128 between the anti-rotation flange 116 and the base 12. Wear plates 120, as previously described, are provided for engagement with the ball 128 to reduce wear on the component parts of the anti-rotation system 124 when the frame 30 rolls on the ball 128 relative to the assembly 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of retaining a movable head assembly of a transducer on a base of the transducer, the transducer further including a linear motor that operatively engages the head assembly, the movable head assembly and base defining a track between the head assembly and the base, and at least two balls disposed in the track between the base and the head assembly, the method comprising:
   providing a magnetic field within the track that retains the balls in the track and retains the head assembly on the base;
   tracking the movement of a tape in a direction perpendicular to a direction of travel of the tape;
   providing a representative signal to a controller that is representative of the movement of the tape in the perpendicular direction; and
   driving the head assembly with the linear motor in the perpendicular direction in response to a signal from the controller that is based upon the representative signal.

2. The method of claim 1 wherein the tape has at least one servo track and the step of tracking the movement of the tape further comprises determining the location of the at least one servo track.

3. The method of claim 1 further comprising providing a permanent magnet on the head assembly that provides the magnetic field within the track.

4. The method of claim 1 further comprising providing a magnet on a tower portion of the base that provokes the magnetic field within the track.

5. The method of claim 4 further comprising providing a magnet on the head assembly that supplements the magnetic field provided in the track by the magnet on the tower portion of the base.

* * * * *